United States Patent
Kido et al.

(10) Patent No.: US 12,102,096 B2
(45) Date of Patent: Oct. 1, 2024

(54) WORK MEASUREMENT DEVICE AND SLIT FORMING SYSTEM

(71) Applicant: MAYEKAWA MFG. CO., LTD., Tokyo (JP)

(72) Inventors: Koji Kido, Tokyo (JP); Keigo Shibama, Tokyo (JP); Hiroyuki Sakurayama, Tokyo (JP); Akira Koizumi, Tokyo (JP); Hajime Akabane, Tokyo (JP); Masaomi Watanabe, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 497 days.

(21) Appl. No.: 17/608,880

(22) PCT Filed: Apr. 27, 2021

(86) PCT No.: PCT/JP2021/016795
§ 371 (c)(1),
(2) Date: Nov. 4, 2021

(87) PCT Pub. No.: WO2021/230072
PCT Pub. Date: Nov. 18, 2021

(65) Prior Publication Data
US 2022/0312781 A1    Oct. 6, 2022

(30) Foreign Application Priority Data
May 12, 2020   (JP) .................................. 2020-083685

(51) Int. Cl.
*A22C 21/00*    (2006.01)
*A22C 17/00*    (2006.01)
*B26D 7/00*     (2006.01)

(52) U.S. Cl.
CPC ........ *A22C 17/0093* (2013.01); *A22C 17/004* (2013.01); *A22C 21/0076* (2013.01); *B26D 7/00* (2013.01)

(58) Field of Classification Search
CPC .............. A22C 17/0093; A22C 17/004; A22C 21/0076
(Continued)

(56) References Cited

U.S. PATENT DOCUMENTS 6,106,384 A * 8/2000 Mutoh ................. A22C 17/004
                                                       452/136
8,033,897 B2  10/2011 Shimachi et al.
(Continued)

FOREIGN PATENT DOCUMENTS

EP    3162216 A1    5/2017
JP    3483710 B2    1/2004
(Continued)

OTHER PUBLICATIONS

English translation of Written Opinion issued in Intl. Appln. No. PCT/JP2021/016795 mailed Jul. 13, 2021, previously cited in IDS filed Nov. 4, 2021.
(Continued)

*Primary Examiner* — Omar Flores Sanchez
(74) *Attorney, Agent, or Firm* — ROSSI, KIMMS & McDOWELL LLP

(57) ABSTRACT

A work measurement device according to an aspect includes a posture holding surface for holding a posture of a work, a first work presser capable of pressing the work against the posture holding surface from an opposite side to the posture holding surface across the work, a contact disposed to be able to contact the work, a moving unit for moving, relative to the contact, the work pressed against the posture holding surface by the first work presser. The contact is configured
(Continued)

to contact the work downstream of the first work presser in a relative movement direction of the work by the moving unit.

12 Claims, 5 Drawing Sheets

(58) Field of Classification Search
USPC .......................................................... 83/364
See application file for complete search history.

(56) References Cited

U.S. PATENT DOCUMENTS

| 9,247,755 | B1* | 2/2016 | Andre | A22B 5/0029 |
|---|---|---|---|---|
| 2006/0030250 | A1* | 2/2006 | Hino | A22B 5/0035 |
| | | | | 452/135 |
| 2014/0378040 | A1* | 12/2014 | Taniguchi | A22C 17/02 |
| | | | | 452/135 |
| 2015/0004892 | A1* | 1/2015 | Taniguchi | A22C 17/004 |
| | | | | 452/187 |
| 2015/0250193 | A1* | 9/2015 | Kido | A22C 21/0053 |
| | | | | 452/135 |
| 2017/0156354 | A1* | 6/2017 | Inoue | A22C 21/0053 |
| 2021/0084916 | A1* | 3/2021 | Kido | A22C 17/00 |
| 2022/0304317 | A1* | 9/2022 | Kido | A22C 17/004 |
| 2022/0346390 | A1* | 11/2022 | Burkhalter | A22C 17/002 |
| 2023/0189827 | A1* | 6/2023 | Janssen | A22C 15/00 |
| | | | | 248/339 |

FOREIGN PATENT DOCUMENTS

| JP | 2013255471 A | 12/2013 |
|---|---|---|
| WO | 2016002630 A1 | 1/2016 |
| WO | 2019131357 A1 | 7/2019 |
| WO | 2019131362 A1 | 7/2019 |
| WO | 2019131363 A1 | 7/2019 |

OTHER PUBLICATIONS

International Search Report issued in Intl. Appln. No. PCT/JP2021/016795 mailed Jul. 13, 2021.
Written Opinion issued in Intl. Appln. No. PCT/JP2021/016795 mailed Jul. 13, 2021.
Extended European Search Report issued in European Appln. No. 21805079.7 mailed Jul. 8, 2022.

* cited by examiner

WORK MEASUREMENT DEVICE AND SLIT FORMING SYSTEM

TECHNICAL FIELD

The present disclosure relates to a work measurement device and a slit forming system.

BACKGROUND

De-boning work of a livestock carcass for meat is hard labor and is also inefficient if done manually, and thus has been automated. The present applicant has developed an automation technology in this field for a long time. Patent Document 1 proposes an automatic de-boning technique for bone-in meat in the middle of de-boning, and Patent Document 2 proposes an automatic measurement technique of measuring the entire length of bone-in meat during conveyance. Further, Patent Document 3 proposes an automatic slit forming technique of forming a slit in bone-in meat during conveyance, and Patent Document 4 proposes an automatic de-boning technique increased in processing efficiency.

CITATION LIST

Patent Literature

Patent Document 1: JP3483710B
Patent Document 2: WO2019/131357A
Patent Document 3: WO2019/131362A
Patent Document 4: WO2019/131363A

SUMMARY

Technical Problem

As demand for meat increases, an automatic de-boning technique of a livestock carcass for meat is required of, for example, improvement in processing efficiency (such as an increase in number of processes per unit time) when bone-in meat obtained by de-boning the livestock carcass for meat is further separated into a bone portion and a meat portion, a downsized automation device, versatility, and further improvement in yield of meat portions. In order to improve the yield of the meat portions, it is necessary, during the de-boning step, to measure the size of an individual work and to perform, based on the measurement value, a tailored de-boning process for each work. In Patent Document 2, when the entire length of the individual bone-in meat is measured, a measuring first pressing plate is held against the work to detect a trajectory of the first pressing plate, thereby measuring a form including the entire length of the bone-in meat. However, the first pressing plate contacts the work in the vicinity of a position where a second pressing plate for pressing the work presses the work, resulting in the first pressing plate tracking the surface of the work deformed by a pressing force of the second pressing plate. Thus, it may be impossible to accurately measure a true form of the work before being deformed.

The present disclosure was made in view of the above, and an object of the present disclosure is to be able to accurately measure a form including the size, the shape, the entire length and the like of bone-in meat (may simply be referred to as a "form", hereinafter) in, for example, an automatic de-boning step for the bone-in meat.

Solution to Problem

In order to achieve the above object, a work measurement device according to the present disclosure includes a posture holding surface for holding a posture of a work, a first work presser capable of pressing the work against the posture holding surface from an opposite side to the posture holding surface across the work, a contact disposed to be able to contact the work, a moving unit for moving, relative to the contact, the work pressed against the posture holding surface by the first work presser. The contact is configured to contact the work downstream of the first work presser in a relative movement direction of the work by the moving unit.

In the present specification, "work" refers to bone-in meat obtained by processing a livestock carcass for meat (the meat in a stage before being completely separated into a bone portion and a meat portion; for example, bone-in limb meat such as arm meat or thigh meat).

A slit forming system according to the present disclosure includes the above-described work measurement device, and a slit forming blade disposed to be movable back and forth with respect to a work position where the work is interposed by the posture holding surface and the first work presser.

Advantageous Effects

A work measurement device according to the present disclosure can accurately measure the form of individual work, and thus, for example, when applied to an automatic de-boning device, it is possible to improve yield of a meat portion separated from a bone portion of individual work. Further, the slit forming system according to the present disclosure can simultaneously perform form measurement and slit formation of individual work, and thus, for example, when applied to the automatic de-boning device, it is possible to improve processing efficiency, to downsize the automatic de-boning device, as well as to measure the entire length of the individual work, making it possible to improve yield of the meat portion in a subsequent bone-meat separation step.

DETAILED DESCRIPTION

Figure 1:
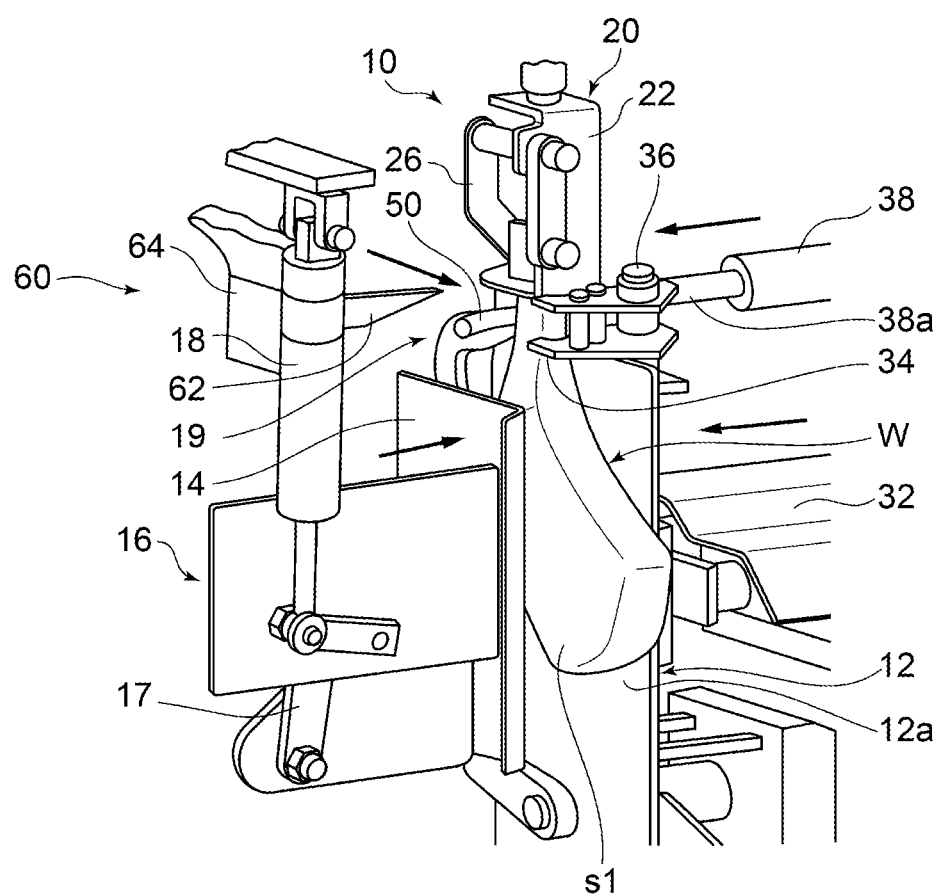
FIG. 1 is a perspective view of a work measurement device and a slit forming device according to an embodiment.

Some embodiments of the present invention will be described below with reference to the accompanying drawings. It is intended, however, that unless particularly specified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, an expressions such as "comprising", "including", "having", "containing", and "constituting" one constitutional element are not intended to be exclusive of other constitutional elements.

Figure 2:
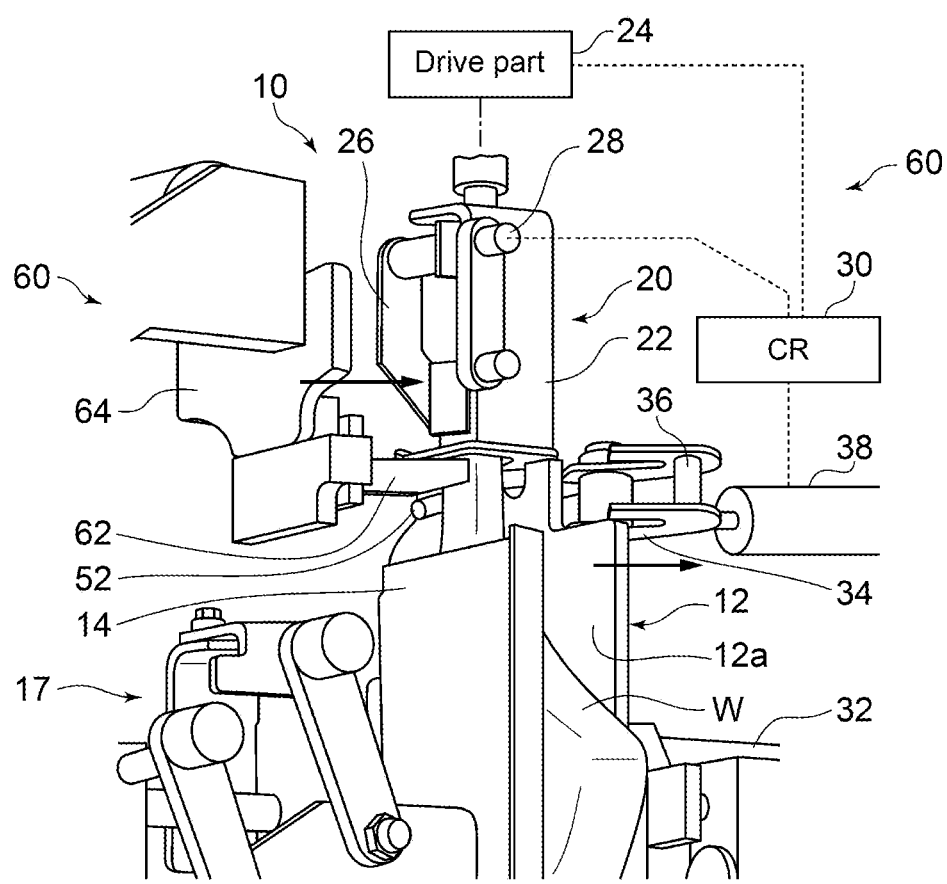
FIG. 2 is a perspective view of the work measurement device and the slit forming device according to an embodiment.
Figure 3:
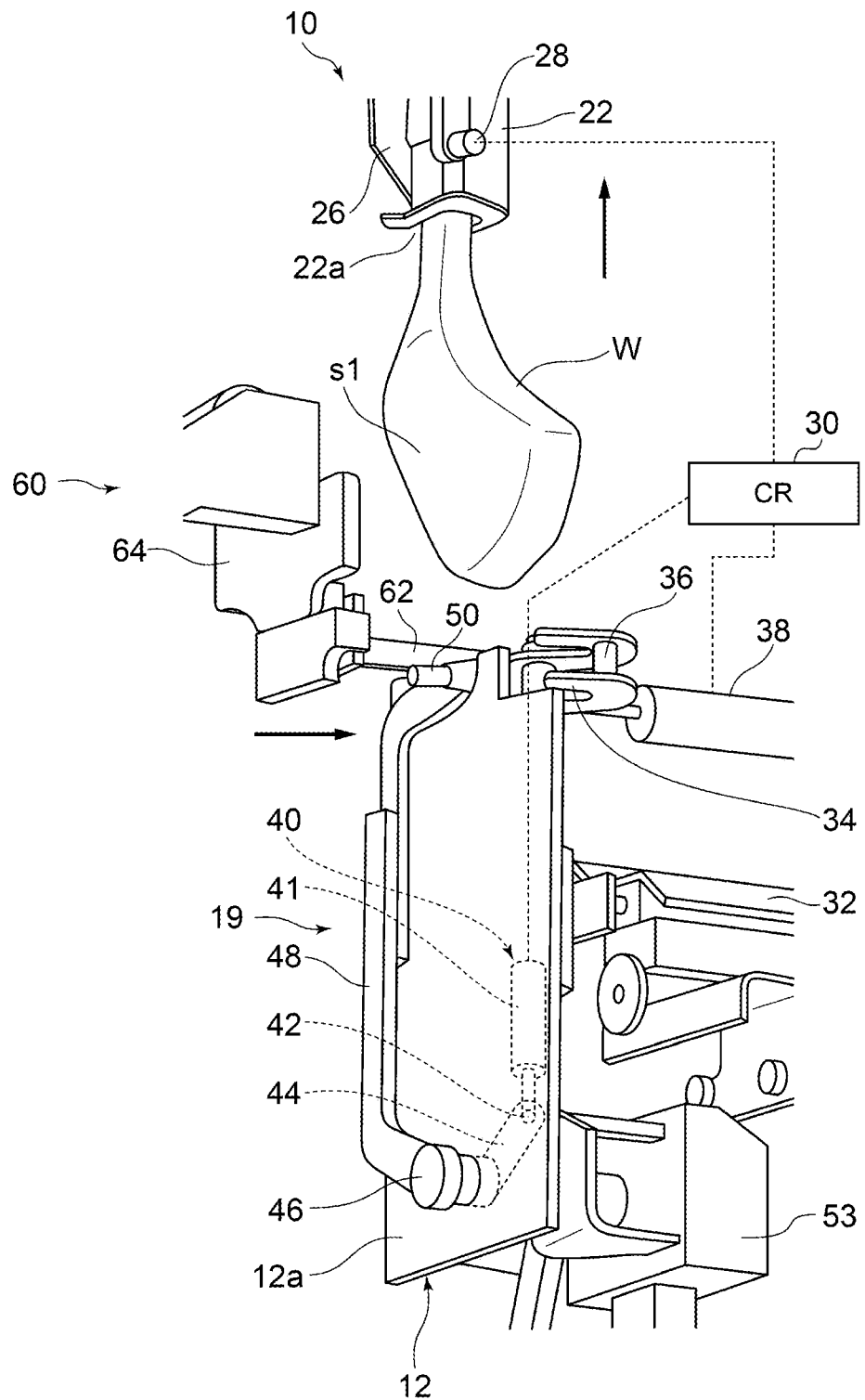
FIG. 3 is a perspective view of the work measurement device and the slit forming device according to an embodiment.

FIGS. 1 to 3 are each a perspective view showing, in sequence following an operation procedure, a slit forming system 60 incorporating a work measurement device 10, together with the work measurement device 10 according to an embodiment. As shown in FIG. 1, the work measurement device 10 includes a posture holding plate 12 having a posture holding surface 12a for holding a posture of a work W available for work measurement. A first work presser 14 is disposed at a position opposite to the posture holding surface 12a across the work W. The first work presser 14 includes a drive part 16 for moving the first work presser 14 in a direction getting close to or away from the posture holding surface 12a. The first work presser 14 is configured to get close to the posture holding surface 12a by the drive part 16 to be able to press the work W against the posture holding surface 12a.

The work measurement device 10 further includes a contact 19 disposed to be able to contact the work W, and a moving unit 20 for supporting and moving the work W. The moving unit 20 is configured to be able to move, relative to the contact 19, the work W pressed against the posture holding surface 12a, and the contact 19 is configured to be able to contact the work W downstream of the first work presser 14 in a direction where the work W is moved relative to the contact 19.

In the present specification, "downstream" means downstream in the direction where the work W is moved relative to the contact 19 by the moving unit 20.

In the above configuration, when the work W is moved relative to the contact 19 by the moving unit 20, the contact 19 can track the surface of the work W while contacting the surface of the work W. Thus, by detecting the trajectory of the contact 19, it is possible to measure the form of the work W. However, if the contact 19 tracks a section where the work W is deformed by a pressing force of the first work presser 14, an error may be caused in a measurement value of the work form. According to the present embodiment, since the contact 19 contacts the work W downstream of the first work presser 14, the contact 19 can track a section other than the section where the work W is deformed by the pressing force of the first work presser 14. Thus, it is possible to measure a true form of the work. Further, since the contact 19 contacts the work W downstream of the first work presser 14, the contact 19 can track a region close to almost the entire length of the work W by movement of the work W. Thus, it is possible to measure the form close to almost the entire length of the work W.

As described above, the contact 19 can measure the form of the work W, and also has a capability to stably hold the work W at a predetermined position by contacting the work W.

In an embodiment, as shown in FIG. 1, the drive part 16 for driving the first work presser 14 includes an air cylinder 18 with a piston being coupled to a link mechanism 17 of the first work presser 14. By reciprocation of the piston, the link mechanism 17 moves the first work presser 14 in the direction getting close to or away from the posture holding plate 12. FIG. 2 does not illustrate the link mechanism 17 and the air cylinder 18.

In an embodiment, as shown in FIG. 1, the posture holding plate 12 is mounted on a drive part (not shown) via a support part 32. The posture holding plate 12 can get close to or away from the work W suspended by a damper 22 at a measurement position, by the drive part. Thus, it is possible to hold the work W at a desired measurement position.

As shown in FIG. 2, the moving unit 20 includes the damper 22 capable of suspending the work W, and a drive part 24 capable of lifting the damper 22 along the vertical direction. Since the moving unit 20 includes the damper 22 to be lifted while suspending the work W, it is possible to downsize the moving unit 20.

In an embodiment, the damper 22 includes a chuck 26 for opening/closing an opening 22a (see FIG. 6) where the work W can be inserted, and a drive part 28 for driving the chuck 26 to open/close the opening 22a of the damper 22. A controller 30 controls the drive part 24 to control a lifted position of the damper 22, as well as controls the drive part 28 to control an opening/closing timing of the chuck 26. The work W is conveyed to the front of the posture holding surface 12a while being suspended by the damper 22, and stops in front of the posture holding surface 12a. Subsequently, the work W is interposed by the first work presser 14 and the posture holding surface 12a to be held at the measurement position.

In an embodiment, the first work presser 14 is constituted by a plate-like body. Further, since the damper 22 moves in the vertical direction, the posture holding plate 12 and the first work presser 14 are disposed to extend along the vertical direction as well, and the posture holding plate 12 and the first work presser 14 are each configured to be movable back and forth with respect to the work W while facing the vertical direction by a corresponding one of the drive parts. Thus, the posture holding plate 12 and the first work presser 14 do not interfere with movement of the work W.

In an embodiment, the contact 19 is disposed to contact the work W in the vicinity of a clamp position of the damper 22. Thus, the contact 19 can track the work surface over almost the entire length of the work W and can measure the form close to almost the entire length of the work W.

In an embodiment, if the moving unit 20 moves the work W relative to the contact 19, a second work presser 34 is disposed opposite to the contact 19 downstream of the first work presser 14. The second work presser 34 is configured to be able to interpose the work W together with the contact 19. By further interposing the work W, which is interposed by the posture holding plate 12 and the first work presser 14, by the contact 19 and the second work presser 34, it is possible to accurately and stably place the work W at a desired position. Thus, it is possible to smoothly measure the form of the work W.

In an embodiment, as shown in FIG. 1, the second work presser 34 is mounted on top of the posture holding plate 12 to be rotatable about a shaft 36. The second work presser 34 has one end portion coupled to a piston 38a of an air cylinder 38. By expansion and contraction of the piston 38a, the second work presser 34 is movable back and forth with respect to the work W at the measurement position centered on the shaft 36.

In an embodiment, the work W conveyed to the front of the posture holding surface 12a while being suspended by the damper 22 stops in front of the posture holding surface 12a. Subsequently, forward movement is performed in order of the posture holding plate 12, the second work presser 34, the contact 19, and the first work presser 14 toward the work W, thereby fixing the work W.

In an embodiment, as shown in FIG. 3, a biasing unit 40 is provided for biasing the contact 19 toward the second work presser 34 in a direction along the posture holding surface 12a. Thus, it is possible to cause the contact 19 to track the surface of the work W with a biasing force. Thus, even if the surface shape of the work W changes, it is possible to always cause the contact 19 to follow the surface of the work W. Thus, it is possible to accurately measure the surface shape of the work.

Further, in the above embodiment, since the contact 19 is biased in the direction along the posture holding surface 12a by the biasing unit 40, a pressing force with respect to the work W by the contact 19 and the second work presser 34, and a pressing force with respect to the work W by the posture holding plate 12 and the first work presser 14 act in a direction orthogonal to each other. Thus, it is possible to place the work W at the predetermined position more accurately and stably.

In an embodiment, as shown in FIG. 3, the biasing unit 40 includes an air cylinder 41 configured to elastically bias the contact 19. Thus, it is possible to downsize the biasing unit 40, as well as to adjust the biasing force applied to the work W by the contact 19 by regulating an air pressure inside the air cylinder 41.

In an embodiment, the air cylinder 41 is fixed to a surface opposite to the posture holding plate 12 with respect to the posture holding surface 12a. Consequently, the air cylinder 41 moves together with the posture holding plate 12, and thus can be disposed so as not to disturb movement of the work W.

In an embodiment, as shown in FIG. 3, the contact 19 is composed of a shaft 46 mounted on the posture holding surface 12a of the posture holding plate 12, an arm 48 which is mounted at one end to the shaft 46 and is rotatable about the shaft 46, and a contact bar 50 mounted to a tip portion of the arm 48 opposite to the shaft 46. The contact bar 50 extends in a direction crossing the vertical direction (substantially the horizontal direction, in FIG. 1), and thus can reliably contact the work W even if the work W suspended by the damper 22 in the vertical direction is shifted to a certain degree in the horizontal direction.

Further, in an embodiment, a tip portion of the piston of the air cylinder 41 is mounted to one end portion of the arm 44, which is mounted on the shaft 46, via the shaft 42 to be rotatable about the shaft. Thus, by expansion and contraction of the piston, it is possible to rotate the arm 48 around the shaft 46.

In an embodiment, as shown in FIG. 2, before lifting of the damper 22 is started with the work W being fixed on the posture holding surface 12a, the controller 30 operates the second work presser 34 to retreat from the work W. Thus, the second work presser 34 can be retreated from the work W before lifting of the damper 22 is started, the second work presser 34 does not interfere with the lifting work W. Thus, it is possible to smoothly lift the work W.

Figure 4:
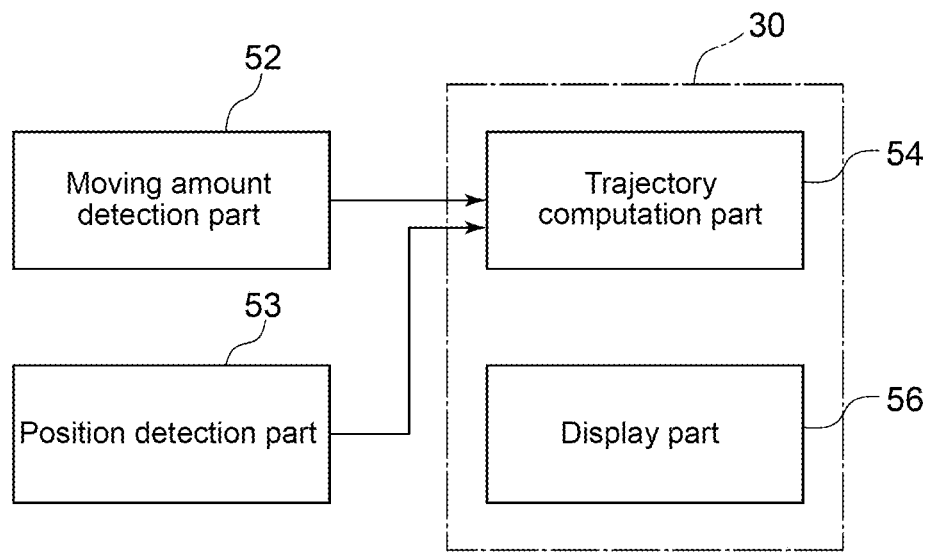
FIG. 4 is a block diagram showing a control system of the work measurement device and the slit forming device according to an embodiment.

FIG. 4 shows a control system of the work measurement device 10 according to an embodiment. As shown in FIG. 4, a moving amount detection part 52 capable of detecting a moving amount of the work W by the moving unit 20, and a position detection part 53 for detecting a position of the contact 19 tracking the surface of the work W are provided. Further, the controller 30 incorporates a trajectory computation part 54 which is configured to be able to plot the trajectory of the contact 19 on two-dimensional coordinates having detected values by the moving amount detection part 52 and the position detection part 53 as coordinate axes, respectively. Thus, it is possible to accurately grasp the form of the work W from the trajectory of the contact 19 displayed on the two-dimensional coordinates.

The trajectory computation part 54 according to an embodiment is implemented by a processor which is a constituent element of the controller 30. The processor is CPU, GPU, MPU, DSP, various kinds of computation devices other than these, or a combination of these. The processor may be an integrated circuit of PLD, ASIC, FPGA, MCU, and the like.

In an embodiment, the position detection part 53 is constituted by an encoder. As shown in FIG. 3, the encoder is disposed on a back surface of the posture holding plate 12, and the shaft 46 is disposed so as to penetrate the posture holding plate 12 and is coupled to the encoder. The encoder detects the position of the contact 19 from a rotation angle of the shaft 46.

Figure 5:
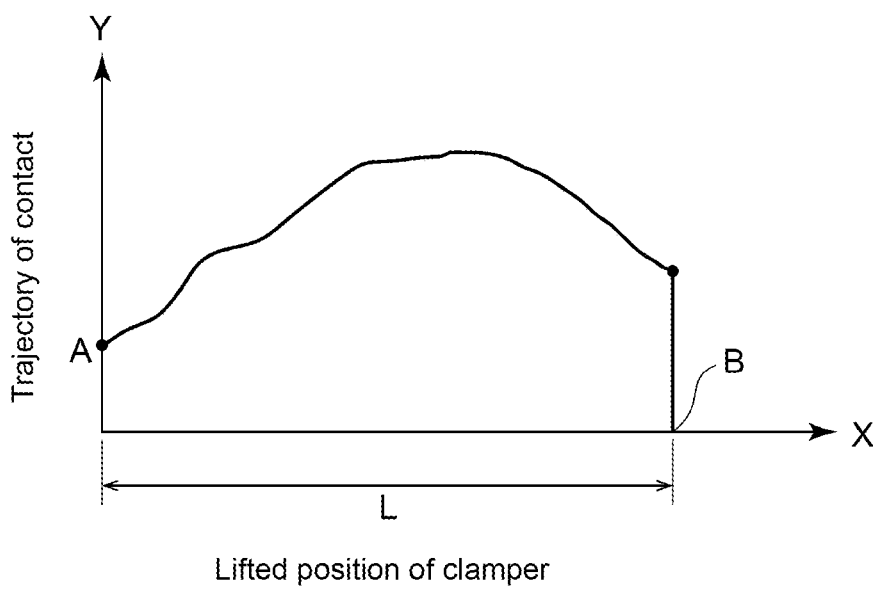
FIG. 5 is a chart representing a trajectory of a contact on two-dimensional coordinates according to an embodiment.

In an embodiment, as shown in FIG. 4, the controller 30 includes a display part 56, and the display part 56 displays the trajectory of the contact 19 represented on the two-dimensional coordinates. FIG. 5 shows an example of the trajectory of the contact displayed on the display part 56. In the chart, point A indicates a position of the contact 19 where the work W is interposed so as to contact the posture holding surface 12a by the posture holding plate 12 and the first work presser 14, and before the work W is lifted by the moving unit 20. Further, point B indicates a position of the contact 19 of the moment when the work W is lifted and the contact 19 is separated from the work W. A length L indicates a length from a position where the contact 19 is in contact before movement of the work W to a lowest end of the work W opposite to the clamp position by the damper 22. From the length L, it is possible to compute the entire length of the work W.

In the above embodiment, the contact 19 is configured to contact the work W downstream of the first work presser 14 in the direction where the work W is moved relative to the contact 19. That is, as shown in FIGS. 1 to 3, in the embodiment where the work W is lifted by the moving unit 20, since the contact 19 contacts the work W in the vicinity of the position where the work W is suspended by the damper 22, the length L is close to almost the entire length of the work W. Therefore, it is possible to accurately measure the form close to almost the entire length of the work W by the trajectory of the contact 19.

In the exemplary embodiment shown in FIGS. 1 to 3, the downstream side is a vertically upper side. In another embodiment, the downstream side may be a vertically lower side. In this case, a configuration where the work W is lowered relative to the contact 19 may be adopted in the work measurement device 10.

The slit forming system 60 according to an embodiment includes the work measurement device 10 according to each embodiment described above, and a slit forming blade 62 disposed to be movable back and forth with respect to the work position where the work W is interposed between the posture holding surface 12a and the first work presser 14. The slit forming system 60 is applied to, for example, an automatic de-boning device for separating bone-in meat into a meat portion and a bone portion completely from slit formation. In this case, the damper 22 suspending the work W sequentially moves to a plurality of processing stations constituting the automatic de-boning device to perform a de-boning process of the work W. The slit forming system 60 constitutes the slit forming station of the automatic de-boning device.

When the work W is conveyed to the slit forming system 60 by the damper 22 and is positioned in front of the posture holding plate 12, the work W is interposed between the posture holding surface 12a and the first work presser 14. Then, before the work W moves together with the damper 22, the slit forming blade 62 is inserted into the work W. Subsequently, if the work W moves relative to the contact 19 and the slit forming blade 62, it is possible to simultaneously perform form measurement and slit formation of the work W. Therefore, if the slit forming system 60 is applied to the automatic de-boning device, it is possible to downsize the automatic de-boning device. Further, by measuring the entire length of the individual work W, it is possible to improve yield of the meat portion in a subsequent bone-meat separation step.

In an embodiment, the slit forming blade 62 is supported by the support part 64, and is configured to be able to get close to or away from the work W held at a slit forming position (the same position as the work measurement position) on the posture holding surface 12a.

In an embodiment, the slit forming blade 62 is configured to be insertable into the work W downstream of the first work presser 14 in the direction where the work W is moved relative to the contact 19. Thus, it is possible to perform slit formation in almost the entire length of the work from the vicinity of the damper 22 to the lowest portion.

In the embodiments shown in FIGS. 1 to 3, the slit forming blade 62 can be inserted in the vicinity of the position where the work W is interposed by the contact 19 and the second work presser 34. Thus, slit formation is possible over almost the entire length of the work W.

Figure 6:
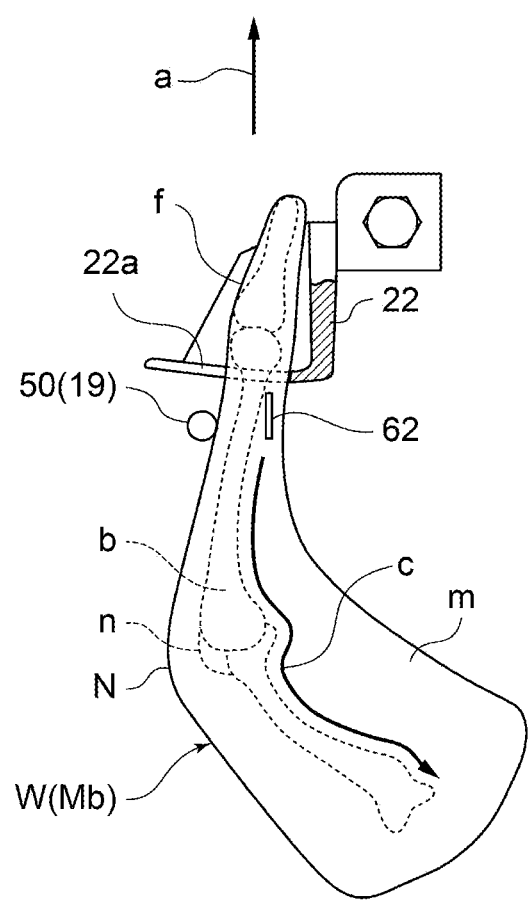
FIG. 6 is a schematic view of bone-in limb meat suspended by a damper.

In an embodiment, the work W is bone-in limb meat. FIG. 6 shows bone-in limb meat of poultry as an example. Bone-in limb meat Mb includes a bone portion b and a meat portion m attached around the bone portion b. The bone-in limb meat Mb includes a knee portion N in an axial center, and a knee joint portion n exists on the inner side of the knee portion N. The moving unit 20 includes the damper 22 capable of suspending the bone-in limb meat Mb, and the drive part 24 for lifting the damper 22 along the vertical direction. Then, the slit forming blade 62 is configured to be inserted into an ankle portion f. In the process of inserting the ankle portion f into the opening 22a of the damper 22 to be suspended and lifting the ankle portion f in the direction of an arrow a, form measurement and slit formation of the work W are performed simultaneously. Since the slit forming blade 62 is inserted into the ankle portion f, it is possible to form a slit over the entire length of the bone-in limb meat Mb. Therefore, if the present disclosure is applied to the automatic de-boning device, it is possible to downsize the automatic de-boning device, as well as to improve yield of the meat portion in the subsequent bone-meat separation step by measuring the entire length of the individual work W.

In an embodiment, the work W interferes with the second work presser 34 if the work W moves relatively, and thus as described above, the second work presser 34 separates from the work W before the work W moves. In this case, the work W is pressed by the contact 19 alone, the work W is likely to move in an opposite direction to the contact 19. In order to suppress such movement of the work W, in an embodiment, as shown in FIG. 6, the slit forming blade 62 is inserted so as to contact the surface of the bone portion b opposite to the contact 19. Thus, the biasing force of the contact 19 acting on the work W is received by supporting bone portion b with the slit forming blade 62 instead of the second work presser 34, making it possible to suppress a horizontal variation in the work W at the time of slit formation. By relatively moving the work W in the direction of the arrow a in this state, it is possible to accurately form a cut c between the bone portion b and the meat portion m.

In an embodiment, when the work W is lifted together with the damper 22, the controller 30 decreases the biasing force of the contact 19 with respect to the work W relative to before the lifting. Thus, it is possible to press the work W against the slit forming blade 62 with an appropriate force, allowing for slit formation along the bone portion b.

If the bone-in limb meat Mb is bone-in limb meat of poultry, one surface of the bone-in limb meat Mb is a skin surface covered with skin, and the other surface is a meat surface which has no skin and is exposed. In an embodiment, as shown in FIGS. 1 to 3, a meat surface s1 is fixed on the posture holding surface 12a to face the side of the slit forming blade 62 and in the slit forming step, the slit forming blade 62 is inserted into the meat surface s1. Thus, the skin surface is not bruised, making it possible to increase a value as boneless meat.

The contents described in the above embodiments would be understood as follows, for instance.

1) A work measurement device (10) according to an aspect includes a posture holding surface (12a) for holding a posture of a work (W), a first work presser (14) capable of pressing the work against the posture holding surface (12a) from an opposite side to the posture holding surface (12a) across the work (W), a contact (19) disposed to be able to contact the work, a moving unit (20) for moving, relative to the contact (19), the work (W) pressed against the posture holding surface (12a) by the first work presser (14). The contact (19) is configured to contact the work (W) downstream of the first work presser (14) in a relative movement direction of the work (W) by the moving unit (20).

With the above configuration, since the contact contacts the work downstream of the first work presser in the relative movement direction of the work by the moving unit, the contact can track a section other than a section where the work is deformed by a pressing force of the first work presser. Thus, it is possible to measure a true form of the work. Further, since the contact contacts the work downstream of the first work presser in the relative movement direction of the work by the moving unit, the contact can track a region close to almost the entire length of the work by movement of the work. Thus, it is possible to measure a work form close to almost the entire length of the work.

2) The work measurement device (10) according to another aspect is the work measurement device defined in 1) which includes a second work presser (34) for interposing the work (W) together with the contact (19), the second work presser (34) being disposed opposite to the contact (19) downstream of the first work presser (14) in the relative movement direction.

With the above configuration, since the work is interposed from both sides by the contact and the second work presser downstream of the first work presser, it is possible to support the work in the vicinity of a support position of the moving unit. Thus, it is possible to stably hold the work at a predetermined position.

3) The work measurement device (10) according to still another aspect is the work measurement device defined in 2) which includes a controller (30) for retreating the second work presser (34) from the work (W) before movement of the work (W) by the moving unit (20) is started.

With the above configuration, since the second work presser can be retreated from the work before movement of the work by the moving unit is started, the second work presser does not interfere with the lifting work. Thus, it is possible to smoothly lift the work.

4) The work measurement device (10) according to yet another aspect is the work measurement device defined in 2) or 3) which includes a biasing unit (40) for biasing the contact (19) toward the second work presser (34) in a direction along the posture holding surface (12a).

With the above configuration, it is possible to cause the contact to track the surface of the work by the biasing force. Thus, even if a surface shape of the work changes, it is possible to always cause the contact to follow the surface of the work. Thus, it is possible to accurately measure the surface shape of the work.

5) The work measurement device according to yet another aspect is the work measurement device defined in 4), where the biasing unit (40) includes an air cylinder (41) configured to elastically bias the contact (19).

With the above configuration, the biasing unit includes the air cylinder, and thus can be downsized, and by regulating an air pressure of the air cylinder, it is possible to adjust the biasing force of the contact with respect to the work.

6) The work measurement device (10) according to yet another aspect is the work measurement device defined in any one of 1) to 5), where the moving unit (20) includes a damper (22) capable of suspending the work (W), and a drive part (24) for lifting the damper (22) along a vertical direction.

With the above configuration, the moving unit includes the damper capable of suspending the work, and thus can be downsized. In addition, if the work measurement device is applied to an automatic de-boning device, it is possible to perform a de-boning process by transferring the damper suspending the work directly to another processing station, making it possible to continuously perform a plurality of processing steps while the work is suspended by the damper.

7) The work measurement device (10) according to yet another aspect is the work measurement device defined in any one of 1) to 6) which includes a moving amount detection part (52) capable of detecting a moving amount of the work (W) by the moving unit (20), a position detection part (53) for detecting a position of the contact (19), and a trajectory computation part (54) capable of plotting a trajectory of the contact (19) on two-dimensional coordinates having detected values by the moving amount detection part (52) and the position detection part (53) as coordinate axes, respectively.

With the above configuration, it is possible to represent the trajectory of the contact on the two-dimensional coordinates, making it possible to accurately grasp the surface shape of the work. Thus, it is possible to accurately grasp the form of the work.

8) A slit forming system (60) according to an aspect includes the above-described work measurement device, and a slit forming blade (62) disposed to be movable back and forth with respect to a work position where the work (W) is interposed by the posture holding surface (12a) and the first work presser (14).

With the above configuration, moving the work relative to the contact and the slit forming blade by the moving unit with the above-described slit forming blade being inserted into the work, it is possible to perform slit formation of the work simultaneously with form measurement of the work. Therefore, if the present disclosure is applied to the automatic de-boning device, it is possible to downsize the automatic de-boning device, as well as to improve yield of a meat portion in a subsequent bone-meat separation step by measuring the entire length of the individual work.

9) The slit forming system (60) according another aspect is the slit forming system defined in 8), where the work (W) is bone-in limb meat (Mb), the moving unit (20) includes a damper (22) capable of suspending the bone-in limb meat (Mb), and a drive part (24) for lifting the damper (22) along a vertical direction, the bone-in limb meat (Mb) is clamped at an ankle portion (f) thereof by the damper (22), and the slit forming blade (62) is configured to be inserted into the ankle portion (f).

With the above configuration, since the work is lifted with the slit forming blade being inserted into the ankle portion, it is possible to form a slit in the bone-in limb meat over almost the entire length thereof.

REFERENCE SIGNS LIST

10 Work measurement device
12 Posture holding plate
12a Posture holding surface
14 First work presser
16, 24, 28 Drive part
17 Link mechanism
18, 38, 41 Air cylinder
38a Piston
19 Contact
20 Moving unit
22 Clamper
22a Opening
26 Chuck
30 Controller
32, 64 Support part
34 Second work presser
36, 42, 46 Shaft
40 Biasing unit
44, 48 Arm
50 Contact bar
52 Moving amount detection part
53 Position detection part
54 Trajectory computation part
60 Slit forming system
62 Slit forming blade
Mb Bone-in limb meat
N Knee portion
W Work
b Bone portion
f Ankle portion
m Meat portion
n Knee joint portion

The invention claimed is:
1. A work measurement device, comprising:
a posture holding surface for holding a posture of a work;

a first work presser capable of pressing the work against the posture holding surface from an opposite side to the posture holding surface across the work;

a contact disposed to be able to contact the work; and a moving unit for moving, relative to the contact, the work pressed against the posture holding surface by the first work presser, wherein the contact is configured to contact the work downstream of the first work presser in a relative movement direction of the work by the moving unit.

2. The work measurement device according to claim 1, comprising a second work presser for interposing the work together with the contact, the second work presser being disposed opposite to the contact downstream of the first work presser in the relative movement direction.

3. The work measurement device according to claim 2, comprising a controller for retreating the second work presser from the work before movement of the work by the moving unit is started.

4. The work measurement device according to claim 2, comprising a biasing unit for biasing the contact toward the second work presser in a direction along the posture holding surface.

5. The work measurement device according to claim 4, wherein the biasing unit includes an air cylinder configured to elastically bias the contact.

6. The work measurement device according to claim 1, wherein the moving unit includes:
 a clamper capable of suspending the work; and
 a drive part for lifting the clamper along a vertical direction.

7. The work measurement device according to claim 1, comprising:
 a moving amount detection part capable of detecting a moving amount of the work by the moving unit;
 a position detection part for detecting a position of the contact; and
 a trajectory computation part capable of plotting a trajectory of the contact on two-dimensional coordinates having detected values by the moving amount detection part and the position detection part as coordinate axes, respectively.

8. A slit forming system, comprising:
the work measurement device according to claim 1; and
a slit forming blade disposed to be movable back and forth with respect to a work position where the work is interposed by the posture holding surface and the first work presser.

9. The slit forming system according to claim 8,
wherein the work is bone-in limb meat,
wherein the moving unit includes:
 a clamper capable of suspending the bone-in limb meat; and
 a drive part for lifting the clamper along a vertical direction,
wherein the bone-in limb meat is clamped at an ankle portion thereof by the clamper, and
wherein the slit forming blade is configured to be inserted into the ankle portion.

10. The work measurement device according to claim 1,
wherein the moving unit is configured to move the work vertically upward relative to the contact, and
wherein the contact is configured to contact the work at a height position corresponding to an upper part of the posture holding surface.

11. The work measurement device according to claim 6,
wherein the contact is configured such that the contact starts to contact the work in a vicinity of a clamp position of the work by the clamper.

12. The work measurement device according to claim 11,
wherein the contact is configured such that the contact starts to contact a portion of the work directly below the clamp position of the work by the clamper.

* * * * *